(12) United States Patent
Battlogg et al.

(10) Patent No.: US 9,033,120 B2
(45) Date of Patent: May 19, 2015

(54) SHOCK ABSORBER FOR A BICYCLE

(71) Applicant: DT Swiss, Inc., Grand Junction, CO (US)

(72) Inventors: Stefan Battlogg, St. Anton I.M. (AT); Martin Walthert, Aarberg (CH); Michael Kieber, Schruns (AT); Juergen Poesel, Bludenz (AT)

(73) Assignee: DT Swiss Inc., Grand Junction, CO (US)

( * ) Notice: Subject to any disclaimer, the term of this patent is extended or adjusted under 35 U.S.C. 154(b) by 0 days.

(21) Appl. No.: 13/927,709

(22) Filed: Jun. 26, 2013

(65) Prior Publication Data

US 2013/0341843 A1    Dec. 26, 2013

(30) Foreign Application Priority Data

Jun. 26, 2012 (DE) .......................... 10 2012 012 534

(51) Int. Cl.
     *F16F 9/53*        (2006.01)
     *B62K 25/04*      (2006.01)
     *F16F 9/34*        (2006.01)
     *F16F 13/00*       (2006.01)
     *F16F 9/49*        (2006.01)

(52) U.S. Cl.
CPC . *B62K 25/04* (2013.01); *F16F 9/49* (2013.01); *F16F 9/3405* (2013.01); *F16F 9/53* (2013.01); *B62K 2025/044* (2013.01); *F16F 9/532* (2013.01); *F16F 9/537* (2013.01); *F16F 13/00* (2013.01)

(58) Field of Classification Search
CPC ............ B62K 25/04; F16F 9/53; F16F 9/532; F16F 9/537; F16F 9/49; F16F 9/585; F16F 13/00

USPC ........ 188/267, 267.1, 267.2, 284; 267/64.15, 267/64.25, 64.26
See application file for complete search history.

(56) References Cited

U.S. PATENT DOCUMENTS

| | | | |
|---|---|---|---|
| 6,471,018 B1 * | 10/2002 | Gordaninejad et al. ... | 188/267.1 |
| 2003/0000781 A1 * | 1/2003 | Oliver et al. ............... | 188/267.2 |

(Continued)

FOREIGN PATENT DOCUMENTS

| | | |
|---|---|---|
| DE | 3631107 A1 | 3/1988 |
| DE | 19820570 A1 | 11/1999 |
| DE | 112004002264 T5 | 10/2006 |
| DE | 60320456 T2 | 6/2009 |

(Continued)

*Primary Examiner* — Bradley King
(74) *Attorney, Agent, or Firm* — Laurence A. Greenberg; Werner H. Stemer; Ralph E. Locher

(57) ABSTRACT

Shock absorber for an at least partially muscle-powered bicycle having a damper device having a first and a second damper chamber assigned thereto which are hydraulically coupled with one another through a damping valve. In the damping valve a flow duct with a field-sensitive, rheological medium is provided. The damping valve has a field generating device assigned to it which serves for generating and controlling a field intensity in the flow duct of the damping valve. The flow duct comprises in the damping valve a collection chamber which is hydraulically connected with the first damper chamber through a plurality of flow apertures, wherein at least one flow aperture is configured as a through hole and at least one flow aperture, as a closable valve opening provided with a one-way valve. The collection chamber is hydraulically connected hydraulically with the second damper chamber via a plurality of fan-type damping ducts each separated from one another by a fan wall.

19 Claims, 6 Drawing Sheets

(56) References Cited

U.S. PATENT DOCUMENTS

| | | |
|---|---|---|
| 2004/0118646 A1 | 6/2004 | Lun |
| 2004/0124049 A1 | 7/2004 | St. Clair et al. |
| 2005/0112375 A1 | 5/2005 | Schade et al. |
| 2011/0127706 A1 | 6/2011 | Sims et al. |
| 2012/0085606 A1 | 4/2012 | Walthert et al. |
| 2013/0025987 A1* | 1/2013 | Batterbee .................. 188/267.2 |

FOREIGN PATENT DOCUMENTS

| | | |
|---|---|---|
| DE | 102009060550 A1 | 6/2011 |
| EP | 1433974 A1 | 6/2004 |
| JP | 2004301271 A | 10/2004 |
| JP | 2005076752 A | 3/2005 |
| JP | 2009252873 A | 10/2009 |
| WO | 2010007433 A2 | 1/2010 |

\* cited by examiner

SHOCK ABSORBER FOR A BICYCLE

CROSS-REFERENCE TO RELATED APPLICATION

This application claims the priority, under 35 U.S.C. §119, of German application DE 10 2012 012 534.1, filed Jun. 26, 2012; the prior application is herewith incorporated by reference in its entirety.

BACKGROUND OF THE INVENTION

Field of the Invention

The present invention relates to a shock absorber for an at least partially muscle-powered vehicle and in particular a bicycle. The bicycle may be equipped with an auxiliary drive and in particular an electric auxiliary drive.

Many different types of rear wheel dampers and suspension forks for bicycles have become known in the prior art. A shock absorber typically comprises a spring unit for cushioning any shocks occurring and a damping unit for damping the spring vibration. In the case of rear wheel shock absorbers the spring unit and the damping unit are as a rule configured as an integral unit. In the case of suspension forks the damping unit and the spring unit may be disposed separately.

Most dampers for bicycles are operated with oil as the damping fluid. For damping, the damping fluid is conveyed from a first damping chamber to a second damping chamber through a valve gate throttling the flow. The size of the valve gate aperture determines the damping strength. An optimal damping is dependent on a number of factors such as for example the rider's weight and in particular the terrain characteristics. It is desirable to set the damping strength in relation to loads such that weak shocks are dampened less than heavy shocks. For rides on a road, a forest path, or directly off-road, different damping settings are therefore optimal.

For adjusting and influencing damping, magneto-rheological and electro-rheological fluids have become known whose characteristics can be influenced by means of applying a corresponding magnetic or electric field. The exemplary embodiments described in the present application of a damper using a magneto-rheological fluid may thus also be constructed using an electro-rheological fluid.

Most magneto-rheological fluids consist of a suspension of small particles that polarize magnetically and which are finely dispersed in a carrier liquid such as oil. The polarizing particles which tend to consist of a carbonyl ferrous powder have typical diameters between approximately 0.1 and 50 micrometers, under the influence of a magnetic field forming chain-like structures capable of absorbing field-dependent shear stresses. This allows to change for example the flow resistance of a valve in a way similar to viscosity changes. The process is fast and reversible such that the initial rheologic state will be reinstated as the magnetic field is broken. Thus, magneto-rheological fluids are suitable to be used in dampers of bicycles.

In the case of shock absorbers for bicycles, users tend to desire different damping rates for example in the compression of a rear wheel damper and in rebound. Higher damping rates in rebound are often desired for the bicycle to show optimal riding characteristics in certain operating conditions. For example WO 2010/007433 A2 discloses a shock absorber for bicycles in which in compressing, the magneto-rheological fluid is allowed to pass through a damping valve on which a magnetic field can be applied. In rebound, damping occurs through conventional, mechanically adjustable shim valves. Thus the set magnetic field only acts in compressing. Thus, different damping rates are basically possible in this known shock absorber in compressing and in rebound since different flow ducts are used. The drawback of this known system is, however, that electronic setting of the damping force acts in compressing only while rebound processes require mechanical setting of the damping force.

SUMMARY OF THE INVENTION

Against the cited prior art it is therefore the object of the present invention to provide a shock absorber for an at least partially muscle-powered bicycle which is provided with a damping valve with a field-sensitive fluid and which offers flexibility in setting the damping characteristics and which, in dependence on the direction of movement, enables damping in different strengths which can be controlled in both directions.

This object is solved by a shock absorber having the features of claim 1. Preferred specific embodiments are the subjects of the subclaims. Further advantages and features of the invention can be taken from the general description and the description of the exemplary embodiment.

A shock absorber according to the invention is provided for an at least partially muscle-powered bicycle, comprising a damper device to which a first and at least one second damper chamber are assigned. The first and second damper chambers are hydraulically coupled with one another through at least one damping valve. At least the damping valve is provided with at least one flow duct therein with a field-sensitive, rheological medium. The at least one damping valve has at least one field generating device assigned to it which serves for generating and controlling a field intensity in the flow duct of the damping valve. The flow duct in the damping valve comprises at least one collection chamber which is hydraulically connected with the first damper chamber through a plurality of flow apertures. At least one of these flow apertures is configured as a through hole and at least one of these flow apertures, as a closable valve opening provided with a one-way valve. Furthermore the collection chamber is hydraulically connected hydraulically with the second damper chamber via at least a plurality of fan-type damping ducts. The fan-type damping ducts are separated from one another by at least one fan wall.

The shock absorber according to the invention has many advantages. Due to the fact that the damping valve comprises a flow duct with fan-type damping ducts followed by a collection chamber that is connected with the other end of the damping valve via a plurality of flow apertures, the flow apertures, some of which are configured as one-way valves, allow providing different damping characteristics for the different flow directions.

While the flow apertures provided with one-way valves allow the field-sensitive, rheological medium to flow through in one of the flow directions, the field-sensitive, rheological medium is only allowed to pass through the flow apertures configured as through holes in the opposite flow direction. The flow apertures are connected in series with the fan-type damping ducts such that a clearly reduced flow cross-section is provided by way of the closed flow apertures such that different damping characteristics are specified in the two flow directions. Furthermore the field-sensitive, rheological medium flows through all the fan-type damping ducts in both the flow directions where it can be subjected to different field intensities depending on the flow direction.

Trials have shown that the closing of individual damping ducts may lead to unsatisfactory results or even failure of these shock absorbers. When only one of multiple fan-type damping ducts is closed by a one-way valve, then considerably different pressures may act in operation in each of the damping ducts. This may lead to temporary or even permanent deformation of a thin fan wall such that the performance of the shock absorber deteriorates or the entire shock absorber may even be destroyed. The fact that according to the invention, the fan-type damping ducts lead into a collection chamber which in turn is followed by the through holes some of which can be closed, ensures that flow simultaneously passes through all the fan-type damping ducts at all times. In this way the pressure levels are at least approximately similar within the fan-type damping ducts.

At the same time the invention also achieves that different flow cross-sections are present in the compression stage and in the rebound stage such that the basic damping in the compression stage and in the rebound stage differs. Furthermore, both in the compression stage and in the rebound stage the field generating device can apply a desired field such that the precise level of damping can be controlled as desired. Operation is basically feasible at similar field intensities in the compression and rebound stages. Even in the case of identical field intensities very different damping strengths are achieved depending on the flow direction.

A considerable advantage of a shock absorber according to the invention is the fact that due to the damping levels differing in relation to the flow direction, bicycles equipped with such a shock absorber remain "operable" even in the absence of control. If control or voltage supply should fail, the damping differing in the compression and rebound stages generates a basic damping which may be adapted e.g. to the desired operating range.

Moreover, the energy required for control is reduced if the basic damping is already generally adapted to the desired operating range. For obtaining a desired characteristic curve, the field generating device needs to generate comparably little and in any case less of a difference in fields or forces in this case.

It is possible to provide not only two fan-type damping ducts but three or more fan-type damping ducts may be present. It is also possible for multiple groups of fan-type damping ducts to be for example distributed over the circumference.

Preferably the fan-type damping ducts are arranged such that they are active both in compression stage and rebound stage damping.

In advantageous configurations the one-way valves are disposed and structured such that they automatically open in compression stage damping and automatically close in rebound stage damping. It is preferred to use little force for shifting the one-way valves to ensure a sensitive, fast response.

The design of the one-way valves is preferably such that they can withstand the pressure in the locked state and in the flow direction they release the largest possible flow cross-section using little force. A stopper is advantageous so as to prevent the material from overstretching. One-way valves consisting of one or multiple stacked shims have proved to be good.

It is also preferred to use the one-way valve like a shim in conventional dampers. These shim valves or disk valve stacks show as a rule a non-linear force path for generating the desired characteristic damper curve. In the shock absorber according to the invention a non-linear force path may be approximated to a desired basic curve via a shim valve or a stack of disk valves.

In preferred specific embodiments the damping valve is disposed at a damping piston unit comprising the damping piston and a piston rod. In particular can the damping valve at least substantially be incorporated in the damping piston.

It is possible and preferred for the flow apertures provided with a one-way valve to be substantially disposed at the damping piston. In particular at least some of the flow apertures provided with a one-way valve are substantially oriented axially on the piston surface. This ensures good flow conditions.

It is also preferred for at least one through hole to be provided at the piston rod where it is in particular oriented substantially radially. In this way the field-sensitive fluid is allowed to pass outwardly from the piston rod interior and vice versa. Preferably the collection chamber extends at least in part inside the piston and at least in part inside the piston rod. It is particularly preferred to provide two or more collection chambers.

In preferred configurations a through hole comprises an end stop cushioning. To this end the through hole may for example be disposed at the piston rod and have an inlet terminating inclined towards the damping piston. Such an inlet terminating inclined allows for example in compressing a simple end stop cushioning in that the inlet terminating inclined and/or the through hole are automatically closed in compressing or rebound so as to enable increasing damping in the vicinity of at least one end stopper.

Preferably at least one spring device is provided comprising a first and at least one second spring chamber provided with a compressible medium. In particular gas and preferably air are employed as the compressible medium. It is also conceivable to employ an elastomeric or steel spring or the like as a spring device.

Preferably the damper device is disposed in a damper housing which dives into the spring device in compressing. Then it is particularly preferred for at least the second spring chamber to surround at least the first damper chamber at least partially at least in the compressed state. This allows a particularly compact structure.

In these configurations it is preferred to provide a spring piston which is movably disposed on the piston rod. The spring piston is in particular suitable for closing the through hole and optionally the inlet terminating inclined, at least in part and preferably entirely, in compressing and/or in rebound.

Preferably at least one damping duct can be exposed to a field of a field generating device extending in the radial direction or transverse to the longitudinal extension of the piston rod. Given such a field orientation the damping duct is exposed to the field of the field generating device over a particularly long distance so as to enable particularly efficient damping.

It is preferred that at least one magnetically conductive ring conductor radially outwardly surrounds the field generating device and/or the damping ducts.

In advantageous configurations the fan wall has a wall thickness that is less than twice a lowest clear extension of a damping duct transverse to the flow direction. This means in particular that the wall thickness of the fan wall is less than the height or width of a damping duct. Particularly preferably the cross-sectional area of the fan wall is less than a cross-sectional area of at least one damping duct. It is also advantageous for the fan wall to have a wall thickness that is smaller than one tenth of the length of the fan wall in the flow direction. The fan wall in particular comprises a wall thickness that is smaller than one fifth of the width of the fan wall transverse to the flow direction.

A thin fan wall allows a compact structure and a low weight. The partitioning into two damping ducts separated by a fan wall allows a high damping force in a small mounting space. Particularly in this case it is important for the different damping ducts to not be exposed to different pressures. In the case of great pressure differences in adjacent damping ducts a thin fan wall cannot withstand the loads and deforms or breaks. To withstand these loads, the fan wall would have to become considerably thicker which would, however, considerably reduce the passage cross-section.

In these configurations a large ratio of the damping duct area relative to the fan wall area is chosen so as to provide the largest possible proportion of clear surface. In the case of a small mounting space this enables a particularly good utilization thereof.

In another configuration according to the invention a shock absorber is provided for an at least partially muscle-powered bicycle and comprises at least one damper device having a first and at least one second damper chamber assigned thereto which are hydraulically coupled with one another through at least one damping valve. At least one flow duct with a field-sensitive, rheological medium is provided in the damping valve. The at least one damping valve has at least one field generating device assigned to it which serves for generating and controlling a field intensity in the flow duct of the damping valve. The damping duct is disposed such that flow passes through the damping duct in the compression stage and in the rebound stage. The damping valve comprises separate flow valves for the compression stage and the rebound stage by means of which a basic curve of the characteristic damper curve can be mechanically adjusted.

A considerable advantage of such a shock absorber is that the basic curve can be adapted to the provided mounting situation. Different frame geometries and frame sizes require different settings. Basically, however, the shock absorber may be varied electrically within its operating range. An adaptation of the basic curve to the softest characteristic damper curve provided allows to save still more energy since only changes relative to the softest characteristic damper curve require electric control.

Preferably it is possible to change the flow resistance by means of at least one e.g. exchangeable flow valve. It is also possible to change the flow resistance of at least one flow valve by way of at least one mechanical adjusting means for setting a basic curve of the characteristic damper curve.

Particularly preferably at least one flow valve is changeable in the compression stage and at least one flow valve, in the rebound stage by means of at least one mechanical adjusting means each or by means of at least one exchangeable flow valve to suitably specify the basic curve of the characteristic damper curve.

Preferably, changing the basic curve requires a skilled person.

Other features which are considered as characteristic for the invention are set forth in the appended claims.

Although the invention is illustrated and described herein as embodied in shock absorber for a bicycle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

With reference to the enclosed figures an exemplary embodiment of a bicycle 200 equipped with shock absorbers 100 will be discussed below.

Figure 1:
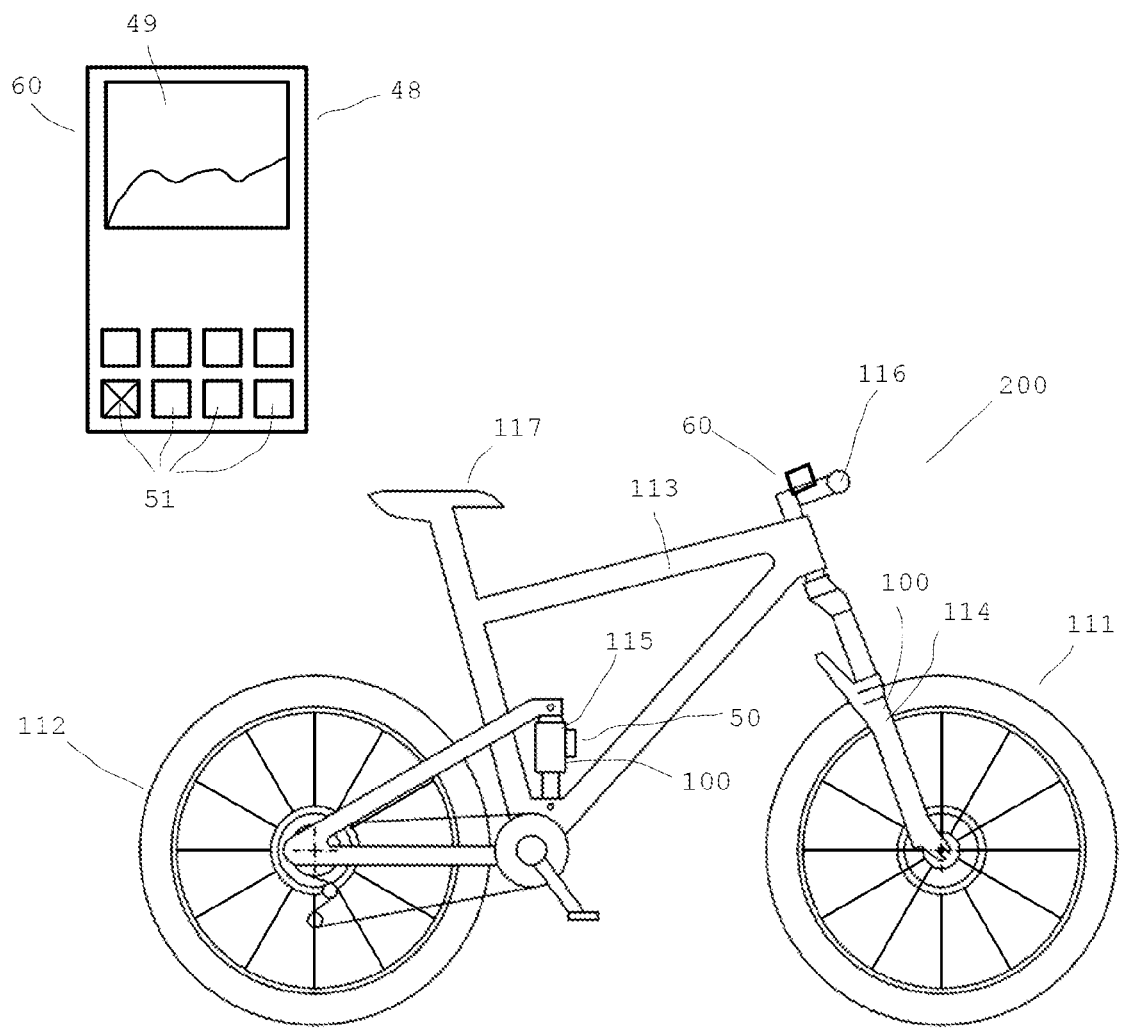
FIG. 1 is a schematic view of a bicycle equipped with a shock absorber according to the invention.

FIG. 1 shows a schematic illustration of a bicycle 200 configured as a mountain bike and comprising a frame 113 and a front wheel 111 and a rear wheel 112. Both the front wheel 111 and the rear wheel 112 are equipped with spokes and may be provided with disk brakes. A gear shifting system serves to select the transmission ratio. Furthermore the bicycle 200 comprises a handlebar 116 and a saddle 117.

The front wheel 111 is provided with a shock absorber 100 configured as a suspension fork 114 and the rear wheel is provided with a shock absorber 100 configured as a rear wheel damper 115. A central control device 60 is presently provided at the handlebar 116.

The central control device 60 may be employed as a suspension system, controlling both the suspension fork 114 and the rear wheel damper 115 in synchrony. Control of the shock absorbers 100 and further bicycle components may be provided in dependence on many different parameters and is also done by way of sensor data. Optionally the suspension and/or damping characteristics of the seat post can be adjusted. It is possible to also control by way of the central control device 60 the shifting system for adjusting different transmission ratios.

Additionally each of the shock absorbers 100 comprises at least one control device 46 at an electronic unit 50 provided to be exchangeable. The electronic units 50 comprise at least one battery unit 61. The battery units 61 may be exchanged together with the respective electronic unit or separately. For example rechargeable battery units may be provided which can be quickly removed from the shock absorber together with the electronic unit 50 for recharging the electronic unit. Also possible is energy supply by a central battery unit or by assistance or operation by a dynamo or the like.

Presently a control device 46 or a control unit is incorporated in the shock absorber wherein the control unit provides the basic functions. Operation then occurs via the electronic unit 50 or via the central control device 60. By means of the control device 60 or the control devices 46 the damping properties of the suspension fork 114 and the rear wheel shock absorber 115 can be set.

The central control device 60 is operated via an operating device 48. It is possible for the control device 60 to have a display device 49 and/or multiple operating knobs 51. It is also possible for the control device to be configured touch-sensitive or proximity-sensitive so as to allow operation by way of touching dedicated buttons or the like.

The control device 60 may then also serve as a bicycle computer, displaying data such as the current speed, and the average speed and/or kilometers per day, per tour, per lap, and total. Also possible is displaying the current position, current altitude, or the route traveled or the route profile.

Figure 2:
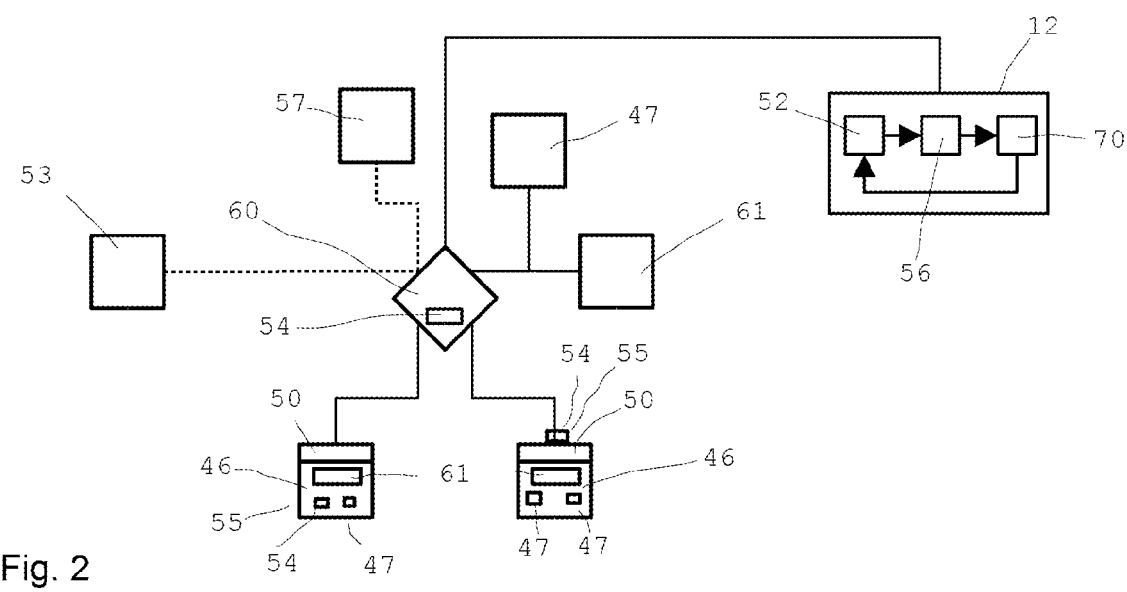
FIG. 2 is a schematic view of the communication connections of the bicycle according to FIG. 1.

FIG. 2 shows a schematic illustration of the communication connections of the components involved. The central control device 60 may be connected with the individual components either wire-bound or wireless for example through WLAN, Bluetooth, ANT+, GPRS, UMTS, LTE, or other transmission standards. The connection shown in dotted lines with the internet 53 is a wireless connection. The control device 60 may be connected with the battery unit 61 or have its own energy supply. Furthermore the control device 60 may be connected with a sensor 47 or multiple sensors 47. The graphic operating unit 57 or display unit may also have a wireless connection with the control unit 60. The shock absorber 100 of the suspension fork 114 or the shock absorber 100 of the rear wheel damper 115 may be connected wireless or wire-bound. Connection occurs through a network interface 54 which may be configured as a radio network interface 55 or a cable connection 56.

In FIG. 2 the control cycle 12 is illustrated schematically which is stored in the memory device and stored or programmed in the control device 60 or the control devices 46. The control cycle 12 is periodically performed in operation and in particular continuously periodically. In step 52 e.g. the sensors 47 capture a current relative motion or current relative speed of the first component relative to the second component. In step 52 a parameter is derived from the values of the sensor 47 or the sensors that is representative of the current relative speed. Thereafter in step 56 the pertaining damping force to be set is then derived from the obtained parameter 81 (see FIGS. 10, 11) taking into account the predetermined or selected characteristic damper curve. A measure of the field intensity to be currently set is derived therefrom with which the damping force to be set is achieved at least approximately. The measure may be the field intensity itself or else indicate the electric current intensity with which the damping force to be set is obtained at least approximately. In the subsequent step 70 the field intensity to be currently set is generated or the corresponding electric current intensity is applied to the electric coil device as the field generating device such that within one single cycle of the control cycle 12 the damping force is generated which in the case of the selected or predetermined characteristic damper curve corresponds to the current relative speed of the first component to the second component. Thereafter the next cycle starts and step 52 is once again performed.

Figure 3:
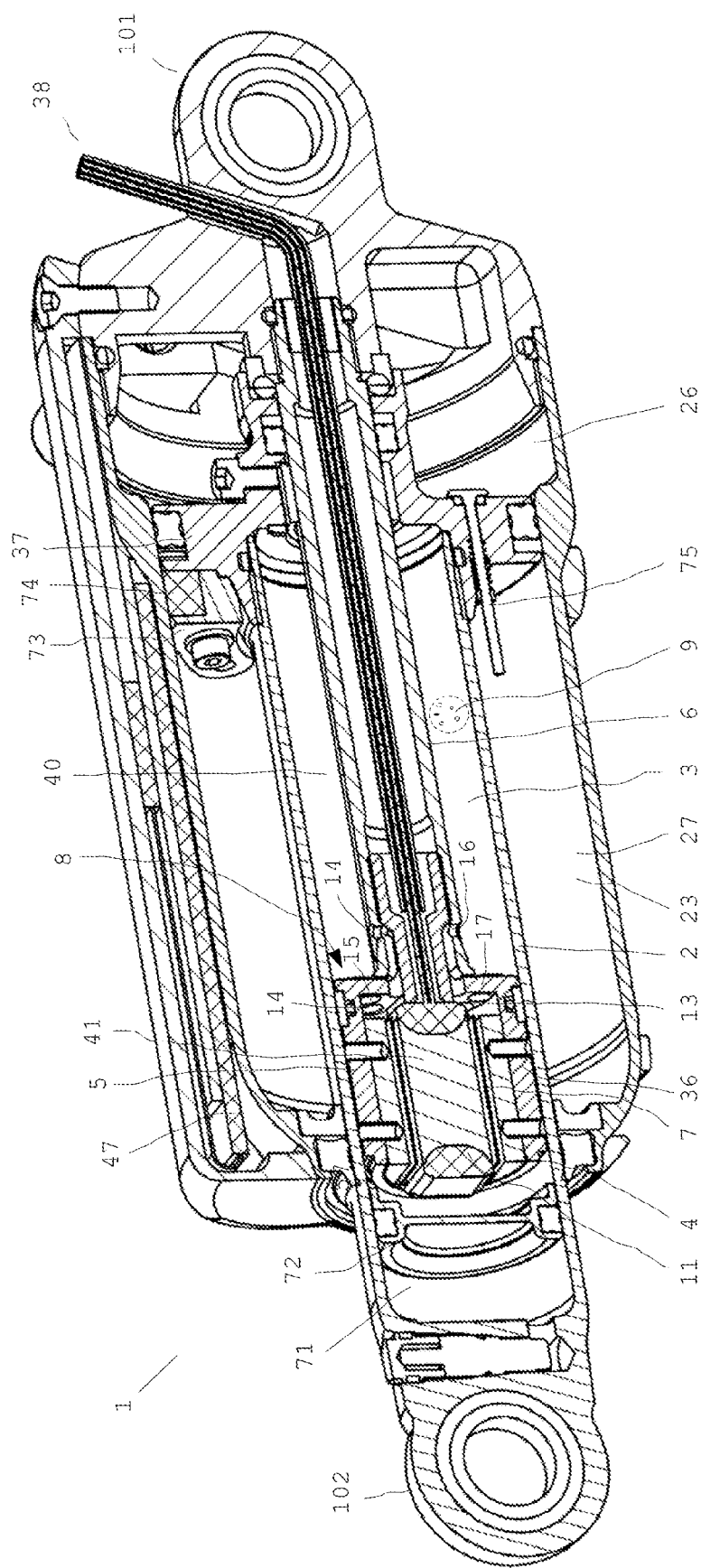
FIG. 3 is a schematic sectional view of a shock absorber of the bicycle according to FIG. 1 with an electronic unit.

FIG. 3 shows a simplistic cross-sectional view of a shock absorber 100 which is presently employed for example in the rear wheel damper 115.

The shock absorber 100 comprises a damper device 1. The shock absorber 100 is fastened, with the first end as the component 101 and the second end as the component 102, to different frame parts for damping relative motions.

Figure 4:
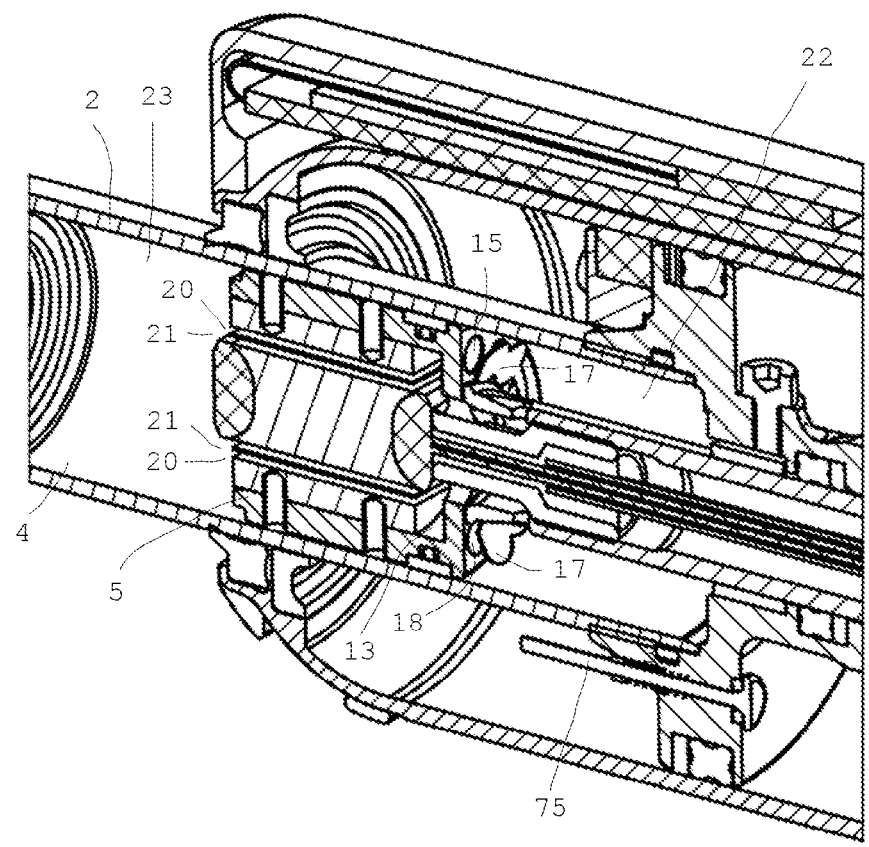
FIG. 4 is a sectional side view of the shock absorber according to FIG. 3 in an enlarged illustration in the compression stage.

In the damper housing 2 a damping piston unit 40 is provided which comprises a damping piston 5 as the damping valve 8 and a piston rod 6 connected therewith. The damping piston 5 is provided with the damping valve 8 therein which presently comprises a field generating device 11 and in particular an electric coil for generating a suitable field intensity. The magnetic field lines in the central region of the core 41 run approximately perpendicular to the longitudinal extension of the piston rod 6 and thus penetrate the damping ducts 20, 21 approximately perpendicular (see FIG. 4). FIG. 4 This causes the magneto-rheological fluid present in the damping ducts 20 and 21 to be effectively influenced so as to allow effective damping of the flow through the damping valve 8. The shock absorber 100 comprises a first damper chamber 3 and a second damper chamber 4 separated from one another by the damping valve 8 configured as the piston 5. In other configurations an external damper valve 8 is possible which is disposed external of the damper housing 2 and connected via supply lines.

The first damper chamber 4 is followed toward its end 102 by the equalizing piston 72 and thereafter by the equalizing space 71. The equalizing space 71 is preferably filled with a gas and serves for equalizing the piston rod volume which in compressing enters into the whole damper housing 2.

Magneto-rheological fluid 9 as the field-sensitive medium is present not only in the damping valve 8 but in the two damping chambers 3 and 4 on the whole.

The flow duct 7 between the first damper chamber 3 and the second damper chamber 4 extends, starting from the second damper chamber 4, firstly through the fan-type damping ducts 20 and 21 which at the other end lead into the collection chamber 13 or collection chambers 13. The magneto-rheological fluid collects there after exiting the damping ducts 20, 21 before passing through the flow apertures 14, 15 into the first damping chamber 3. In compressing, i.e. in the compression stage, flow passes through all of the flow apertures 14, 15. This means that the major portion of the flow presently passes through the flow apertures 15 and the one-way valves 17 automatically open at the flow apertures 15 such that the magneto-rheological fluid can pass from the second damper chamber 4 into the first damper chamber 3.

In the compressed state illustrated the first damper chamber 3 is radially entirely surrounded by the second spring chamber 27 of the spring device 26. This allows a particularly compact structure.

In the case of complete rebound of the shock absorber 100 a spring-loaded plunger 75 causes pressure compensation between the first spring chamber 26 and the second spring chamber 27.

The spring piston 37 is provided at the end of the damper housing 2. Disposed thereat is a holder 73 supporting a magnet 74. The magnet 74 is part of a sensor 47. The sensor 47 comprises a magnetic potentiometer which captures a signal that is representative of the position of the magnet 74 and thus of the spring piston. This potentiometer 47 does not only permit to determine a relative location but presently also permits to determine the absolute stage of compression or rebound of the shock absorber 100.

Figure 5:
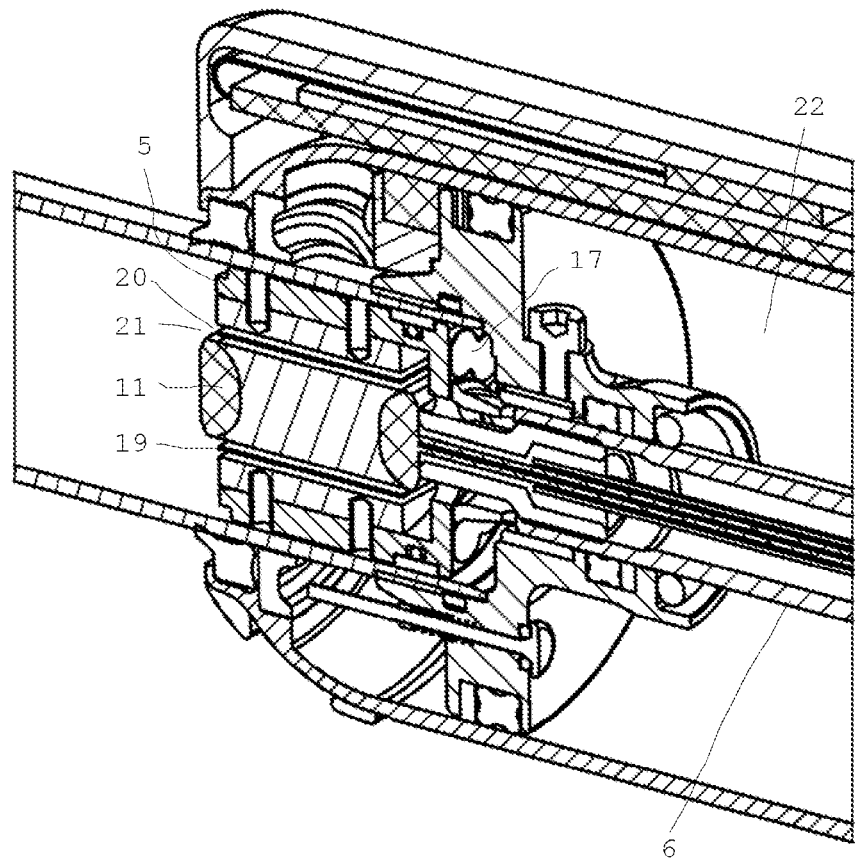
FIG. 5 is an enlarged sectional illustration of the shock absorber in the rebound stage.

FIGS. 4 and 5 show partially enlarged details of the illustration according to FIG. 3, FIG. 4 illustrating the case of the compression stage and FIG. 5, the case of the rebound stage.

Figure 9:
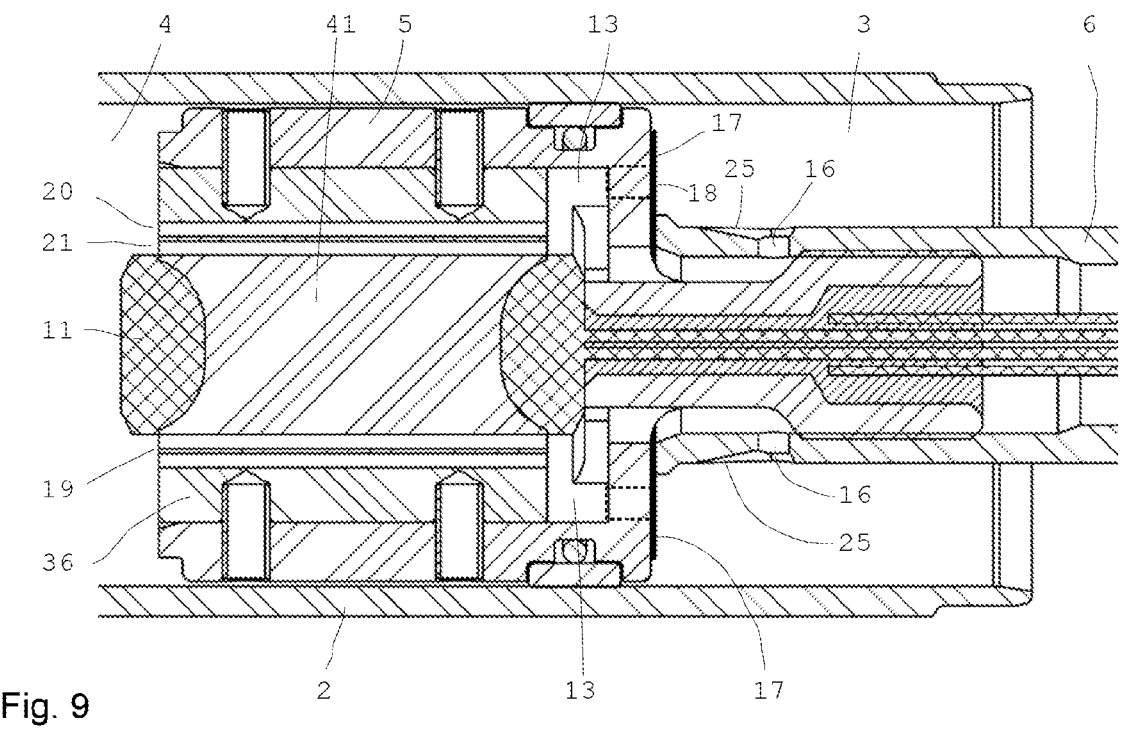
FIG. 9 is an enlarged cross section of the piston unit.

In the case of the compression stage illustrated in FIG. 4, i.e. in compressing, the magneto-rheological fluid 9 emerges from the second damper chamber 4 through the damping ducts 20, 21, entering the damping piston 5. The flow resistance through the damping ducts 20, 21 depends on the magnetic field of the field generating device 11 configured as a coil. After leaving the damping ducts 20, 21 the magneto-rheological fluid collects in the two collection chambers 13 (see FIGS. 9 and 13), thereafter passing through the flow apertures 15, which are permeable in the case of the compression stage, with the one-way valves 17.

In the case of the rebound stage illustrated in FIG. 5 the magneto-rheological fluid flows from the side 22, the side of the piston rod 6, toward the damping piston 5. The one-way valves 17 at the flow apertures 15 close automatically such that only the flow apertures 14 configured for the through holes 16 in the piston rod 6 remain for putting the magneto-rheological fluid into the damping piston 5. When the magneto-rheological fluid 9 has entered through the through hole 16 in the collection chamber 13 or into the collection chambers 13, the magneto-rheological fluid evenly flows through all the fan-type damping ducts 20, 21 until the magneto-rheological fluid exits from the damping piston 5 at the other flow side 23. It can also be clearly seen in FIG. 5 that the damping piston 5 comprises a coil as the field generating device 11, a core 41 of a magnetically conducting material and a ring conductor 36. Furthermore an insulating material 42 may be provided.

The collection chamber 13 enables an efficient series connection of the one-way valves 17, which are in particular configured as shim valves, with the damping ducts 20, 21. The collection chamber 13 serves to avoid in particular inadmissibly high loads on the fan walls 19 due to different pressures in the damper ducts 20, 21. Operating pressures of 30 bars, 50 bars and more can occur which in the case of different loads on both sides of a fan wall 19 may lead to destruction of the thin fan walls 19.

Figure 6:
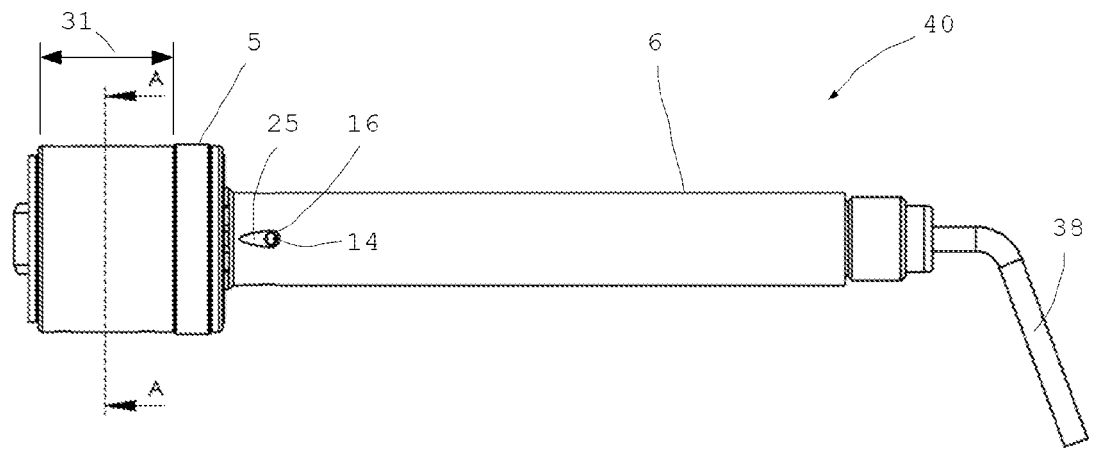
FIG. 6 is the piston unit of the shock absorber according to FIG. 3.

FIG. 6 shows a side view of the damping piston unit 40 with the damping piston 5 and the piston rod 6 from the end of which the cable 38 protrudes. The length 31 of the damping ducts 20, 21 is exemplarily shown. In this illustration one can clearly see the flow aperture 14 configured as a through hole 16 with the inclined inlet 25 following, which provides for an automatically increasing end position damping. When the shock absorber 100 rebounds nearly entirely, then the spring piston 37 firstly slides across the flow aperture 16 and thereafter across the inlet 25, so as to have the flow cross-section continually decreasing and thus the damping force automatically increasing.

Figure 7:
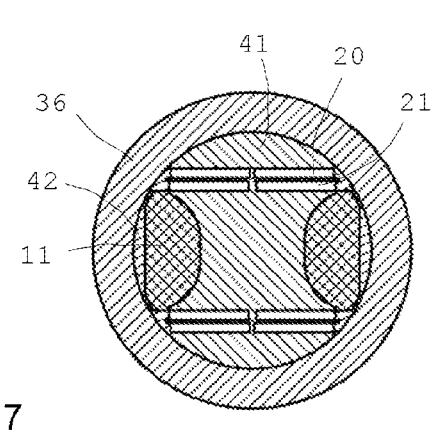
FIG. 7 is the cross section A-A from FIG. 6.

FIG. 7 shows the cross-section A-A in FIG. 6. The core 41 is surrounded by the field generating device 11 configured as a coil. Damping ducts 20 and 21 are disposed in the core. The core and the coil are radially surrounded by ring conductors 36.

Figure 8:
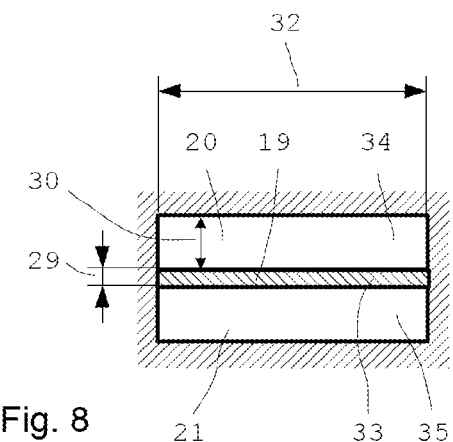
FIG. 8 is a diagrammatic figure of the fan-like damping ducts.

FIG. 8 shows an enlarged illustration of the damping ducts 20, 21 provided in the core 41. The fan-type damping ducts 20, 21 are separated from one another by a fan wall 19. A wall thickness 29 of the fan wall 19 is less than a height 30 of a damping duct 20 or 21. The cross-sectional area 33 of the fan wall 19 is again considerably smaller than is the cross-sectional area 34 or 35 of the damping ducts 20 or 21. In the illustrated example the wall thickness 29 of the fan wall 19 is approximately 0.3 to 0.6 mm. The clear height 30 of the damping ducts 20 or 21 is larger, being 0.5 mm to 0.9 mm.

Values for damping ducts 20, 21 of a rear wheel damper 115 are typically, without being limited thereto, duct lengths 31 between approximately 10 and 30 mm, duct widths between approximately 5 and 20 mm, and duct heights between approximately 0.2 and 1.5 mm. Up to ten damping ducts 20, 21 may be present which may in turn be combined to form one or more groups. Within such a group the damping ducts 20, 21 are separated from one another by fan walls 19 whose wall thicknesses are typically between 0.2 and 1 mm.

The clear flow cross-section, being the sum total of all the damping ducts 20, 21, largely depends on the duct shape, the fluid employed, the piston surface, and the desired range of force. The clear flow cross-section typically lies in the range between 10 and 200 square millimeters.

Figure 10:
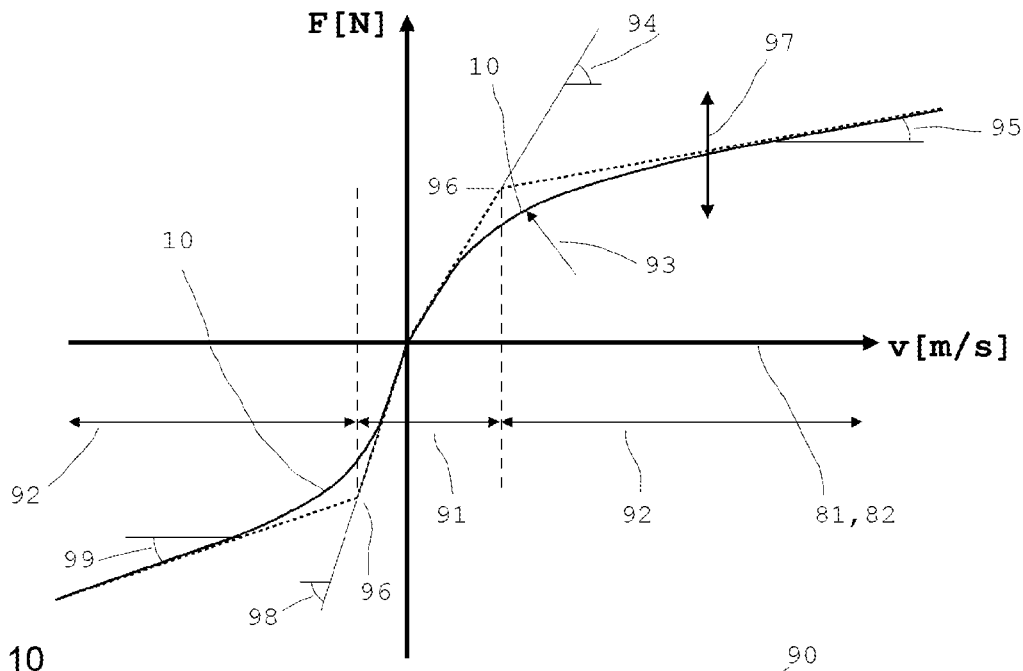
FIG. 10 is a first schematic illustration of a characteristic damper curve for the shock absorber according to FIG. 3.

FIG. 10 shows a characteristic damper curve 10 of the shock absorber 100 according to FIG. 3 with the damping valve 8 in a force-speed diagram. The low-speed range 91 and the high-speed range 92 are connected with a radius 93 by way of a gentle rounding. The characteristic damper curve 10 is presently asymmetric. Although the characteristic damper curve 10 basically shows similar curve paths for the compression and rebound stages, the gradient in the rebound stage is specified to be steeper than in the compression stage.

The characteristic damper curve 10 is set electrically in real time at all times, taking into account the hydraulic basic damping, such that in each instance of a shock or event or each disturbance 85 a suitable damping force is set still during the shock 85 or the disturbance.

The gradient 94 of the characteristic damper curve 10 in low-speed range 91 can be well approximated both for the compression stage and the rebound stage, by way of a straight line showing a substantially linear gradient 94 or 98. The predetermined characteristic damper curve 10 runs through the origin of coordinates such that in the case of a relative speed of the damper piston 5 of zero, there is no damping force. This allows a very soft and agreeable responsivity.

In the high-speed range 92 the gradients 95 and 99 are presently also specified as substantially linear. A curved intermediate section 93 may extend in-between so as to avoid break points 96. Also or one linear intermediate section 93 or multiple linear or slightly curved intermediate sections 93 may be provided to approximate a curved path.

Furthermore an arrow 97 is inserted indicating the effect of a magnetic field having different strengths. Given a higher magnetic field strength the characteristic damper curve shifts upwardly while with a weaker magnetic field it shifts downwardly.

A characteristic damper curve with no intermediate section 93 provided is drawn in a dotted line so as to result in more or less noticeable break points at the points 96.

The gradients 94 and 98 in the low-speed region 91 and the gradients 95 and 99 in the high-speed regions 92 are modifiable and adaptable to the current wishes and conditions, as is the entire characteristic damper curve 10. In this way, as a different ground is recognized, a different characteristic damper curve can be selected automatically, specifying softer or else harder damping. Independently of the selected characteristic damper curve, each and every shock is dampened in real time at all times.

The gradients 95 and 99 in the respective high-speed regions 92 are again specified and can be changed as needed. The power supply for the control device and the electric coil as the field generating device 11 may also be provided by a battery, an accumulator, a generator, dynamo, or in particular a hub dynamo.

Figure 11:
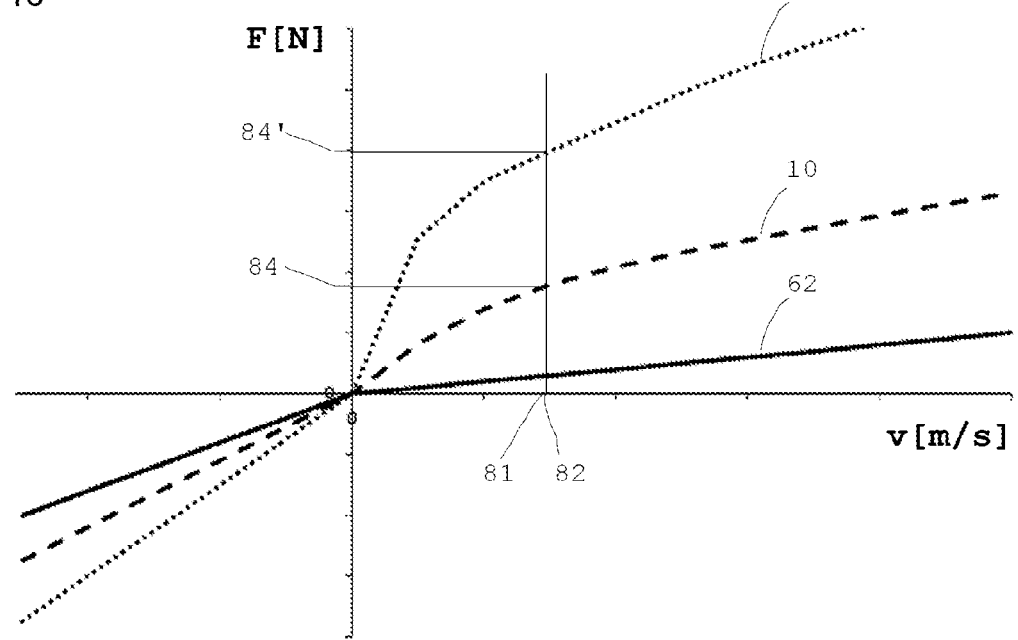
FIG. 11 is a schematic illustration of the basic hydraulic curve of the shock absorber according to FIG. 3 and two different characteristic damper curves.

FIG. 11 illustrates the basic curve 62 and two different characteristic damper curves 10 and 90. It shows the damping force over the relative speed of the components 101 and 102 to one another.

The basic curve 62 represents the hydraulic properties of the shock absorber 100 where no magnetic field is applied. The gradients of the basic curve in the compression stage and in the rebound stage differ by the one-way valves 17 and in the rebound stage they are steeper than in the compression stage.

The characteristic damper curves 10 and 90 are asymmetric in FIG. 11. The characteristic damper curves 10 and 90 represent the resulting damping forces over the relative speed and they are composed of the damping force of the basic curve 62 and the magnetically generated damping force. This means that in the case of a specific compressing or rebounding speed, a damping force lower than the damping force of the basic curve 62 cannot be set. The basic curve 62 must be taken into account in designing. Weaker damping is not possible due to the principle. On the other hand, given a particularly small difference between a characteristic damper curve 10 and the basic curve 62, the electric energy required is particularly low such that a certain adaptation of the basic curve 62 to the softest characteristic damper curve provided is useful. The softest characteristic damper curve provided may e.g. be the characteristic damper curve 10.

A basic curve 62 with "useful" properties ensures reasonable emergency running properties in case that the power supply ceases to provide sufficient energy. Also possible and preferred is a mechanically adjustable emergency valve to provide adjustable emergency running properties.

The gradients in the compression stage and the rebound stage are different. In the rebound stage the gradient 96 is approximately linear on the whole. In the rebound stage there is virtually no differentiation between the low-speed region 91 and the high-speed region 92.

In the compression stage, however, the low-speed region 91 and the high-speed region 92 presently show different gradients 94 and 95 in the case of both the characteristic damper curves 10 and 90 drawn in.

The control device 46 periodically scans the sensor 47 at short, equidistant time intervals of e.g. 1 ms, 2 ms or 5 ms. The control device 46 computes from the signals a parameter 81 for the relative speed 82. It is possible for the control device to obtain from the sensor signals a relative speed 82 to be employed as the parameter 81. In the simplest of cases the sensor 47 directly obtains the associated relative speed. In another simple case the sensor 47 or the control device 46 obtains from the sensor signals a change in path or position of the components 101 and 102 relative to one another. With the time interval between two measurements known, a relative speed 82 and thus a parameter 81 can be derived therefrom. If the time interval between two measurements is substantially constant, a change in position or relative motion may be directly used as the parameter 81.

It is also possible to obtain from values from acceleration sensors or from a set of parameters of multiple different sensor values, a parameter 81 which is representative of the current relative speed 82. One embodiment provides for the data from acceleration sensors and/or displacement sensors to be coupled such that on the one hand, quick reaction is possible to fast changes due to jumps or roughness of road, and on the other hand, precise positioning and speed sensing is achieved in slower actions.

With the parameter 81 thus obtained, the pertaining damping force 84 or 84' is obtained by means of the characteristic damper curve 10 or e.g. 90 stored in a memory device. The associated magnetic field and the pertaining electric current intensity of the coil 11 are derived and adjusted in real time. This means that a cycle is completed within 20 ms and as a rule within 10 ms. Measurements may be taken more frequently, e.g. at time intervals of 5 ms or even at time intervals of 1 or 2 ms or faster still. The control device processes the sensor signals received, generating by means of the coil 11 a magnetic field of a suitable field intensity for generating the damping force pertaining to the parameter 81. The magnetic field acts within the provided cycle time of e.g. 10 ms, adjusting the desired damping force 84.

If the relative speed 82 has changed after another measuring period, a correspondingly different magnetic field is generated such that the control cycle consisting of sensor 47, control device 46 and damping valve 8 as the actor keeps the desired response time, adapting the system in real time.

Measurements have shown that in bicycle dampers, response and cycle times of 10 or 20 ms are entirely sufficient for adjusting damping in real time.

Figure 12:
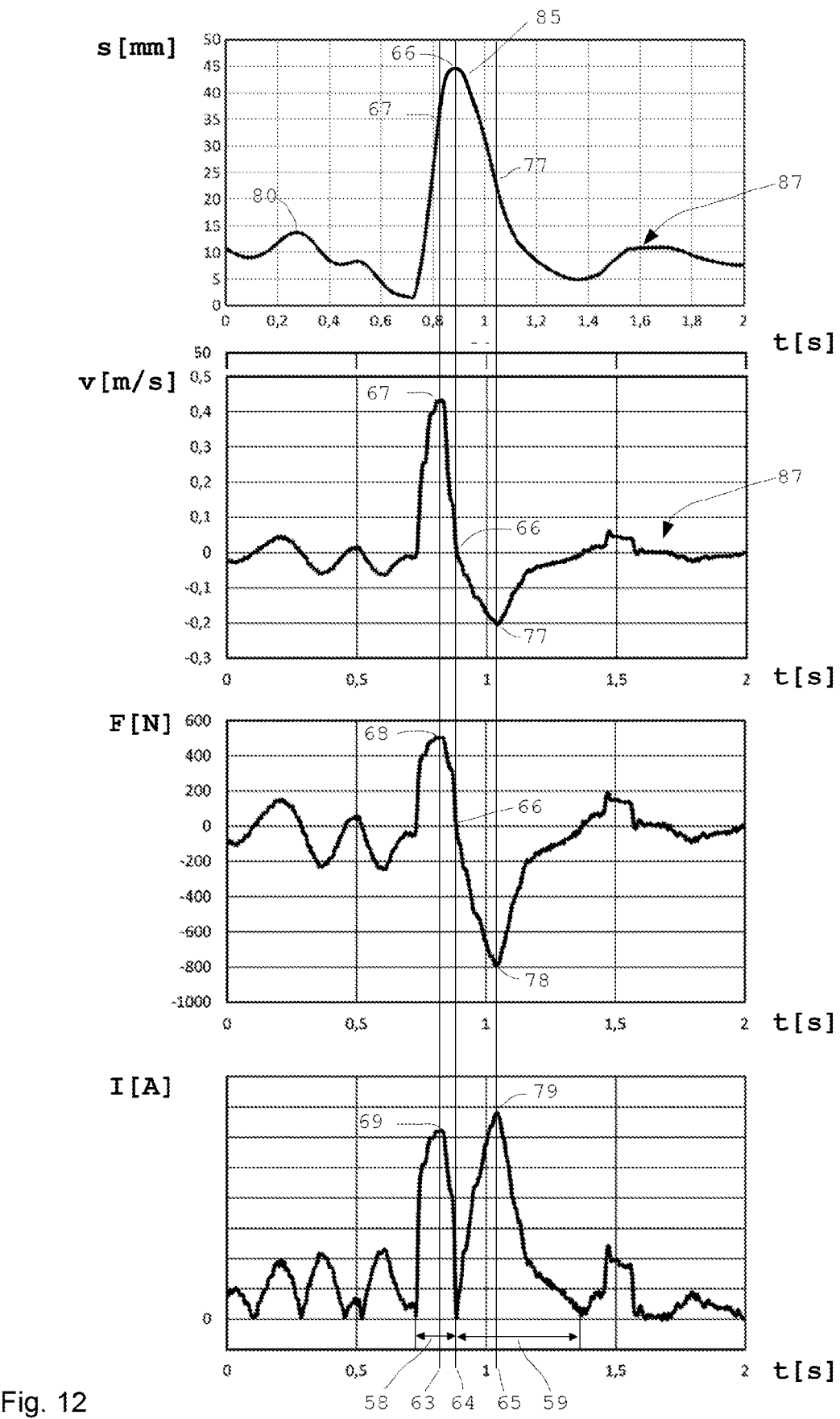
FIG. 12 is the time paths of the suspension travel, the piston speed, the damping force, and the applied current intensity, for the shock absorber according to FIG. 3 during a jump.

This is also shown in the data of an actually measured and dampened jump as illustrated in FIG. 12.

FIG. 12 shows, one above the other, in a number of separate diagrams over time the measurement and control data during a jump performed with a bicycle.

The topmost diagram illustrates the suspension travel in millimeters over time in seconds with the entire time scale only showing 2 seconds. Beneath, the relative speed, the damping force, and the electric current intensity are illustrated accordingly over the same time interval.

Initially the shock absorber 100 is located inside the SAG position and is compressed about 12 mm. During the jump as the event 85 the shock absorber 100 rebounds such that the damping piston 5 is in nearly complete rebound at approximately 0.75 seconds.

After touchdown on the ground the rear wheel begins compressing, obtaining a maximum compressing and thus relative speed 67 in the compression stage which occurs at approximately 0.8 seconds and presently achieves values above 0.4 m/s. At the same time the maximum damping force 68 of presently approximately 500 N is generated at the maximum of the electric current intensity 69 in the compression stage.

A very short time later the maximum compression 66 is reached at the time 64 where the relative speed 67 reaches zero. Accordingly the control device reduces the electric current intensity to zero such that the damping force is zero.

Thereafter the rebound stage damping follows while the shock absorber 100 rebounds once again. At the same time the electric current intensity increases accordingly for adjusting a damping force which corresponds to the relative speed 67 given the characteristic damper curve set.

The maximum relative speed 77 in the rebound stage will occur at the time 65 which presently results in a maximum electric current intensity 79 for generating a maximum damping force 78 of approximately 600 N.

The duration of the jump results from the duration 58 of the compression stage of approximately 0.2 seconds and the duration 59 of the rebound stage of approximately 0.5 seconds, plus the preceding rebound phase.

It immediately follows from the times indicated that a regulating speed of 250 ms is not sufficient. In order to operate at real time, the system must respond within at least 50 ms and better within 20 ms which is presently ensured.

The regulating speed including capturing a sensor signal, deriving a parameter, adjusting the current intensity, and adjusting the damping force 84, is presently less than 10 ms. Thus the control cycle 12 or the control loop is passed through about 200 times within the time period illustrated in FIG. 12.

Figure 13:
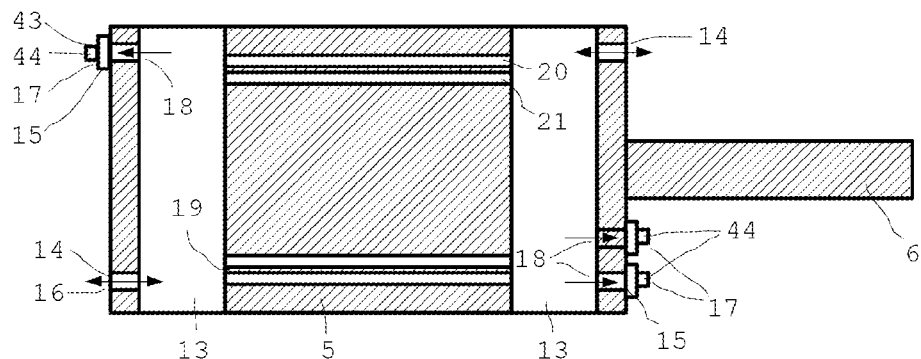
FIG. 13 is another damper piston for the shock absorber according to FIG. 3.

FIG. 13 shows another damper piston 5 for the shock absorber 100 according to FIG. 3. Each of the ends of the damper piston 5 is provided with at least one collection chamber 13. This allows to provide each of the ends of the damper piston with additional flow apertures 14 as flow valves 43 provided in series with a damping duct 20. It is also possible to provide two or more damping ducts 20 and 21.

Due to providing the at least one damping duct 20 between mechanical flow apertures 14 or mechanical flow valves 43, different damping forces can be chosen in the compression and rebound stages. The flow apertures 14 may be configured partially as through holes 16 and partially as one-way valve 17. In this way different damping forces of the basic curve 62 may be specified in each flow direction independently of one another.

The flow valves 43 in particular configured as one-way valves 17 may be adjustable by means of adjusting means 44 such as screws or rotary elements for setting the flow resistance in relation to the direction. For example each of the ends may be provided with a rotary ring as the adjusting means 44 which, in relation to the angle of rotation, closes part or all of one, two, or more of the flow apertures provided over the circumference such that the maximum flow cross-sections available in one or the other of the flow directions 22 or 23 can be set accordingly.

In this way the basic curve 62 of the shock absorber 100 can be adapted as desired both in the rebound stage and in the compression stage. For example an adaptation of the basic curve 62 of the shock absorber 100 to the type of frame may be provided. Depending on the frame geometry and the frame size and the mounting position, preadjustment may be done so as to provide for basic adaptation of the basic curve 62 to the installation conditions.

The basic curve 62 is then preferably set to the mounting situation provided such that it corresponds approximately to the characteristic damper curve 10 having the softest damping provided. If only soft damping is desired or set, then no electric energy at all will be required. The electric coil must be energized only at those times when stronger damping is required. This measure allows to once again considerably reduce electric current consumption.

In all the operating modes of the shock absorber 100 at least one displacement sensor is employed preferably as the sensor device 47. The sensor device 47 is preferably read e.g. at a frequency of 2 kHz and a resolution of 12 bits. In theory, given a stroke of a rear wheel damper 115 of 50 mm once in every 0.5 ms, the relative motion can be determined at an accuracy of 12 μm. Unlike thereto, a suspension fork 114 shows a stroke of e.g. 150 mm, such that under the same conditions a relative motion can be determined at an accuracy of 36 μm.

The data captured by means of the sensor device 47 preferably pass through a low-pass filter and are used for computing the speed wherein a specific damping force is computed by way of the current speed, direction, and the preset characteristic damper curve. This computing operation is repeated e.g. at 500 Hz such that a new force specification is generated once in every 2 ms. An electric current to be set is obtained from the damping force based on the known conjunction of damping force and field intensity required therefor and in turn the electric current intensity required therefor. In particular a dedicated electric current regulator sets the respective electric current at the electric coil device at the shock absorber by way of this specified force such that the resulting damping force is traced sufficiently fast and substantially corresponds to the specification.

The conversion to a digital signal of a relative motion measured by analog meter and the subsequent computing of the specified electric current or the electric current to be set requires hardly any resources, and using a state-of-the-art microcontroller it can be done in a matter of mere microseconds. The electric current regulator provides adequately fast response of the electric coil device such that, notwithstanding inductivity and eddy currents, an electric current jump from 0 to 100% is possible in very few milliseconds.

What is advantageous for the responsivity of the electric current regulator is, the low-pass filter and computation of the relative speed where presently a compromise must be found between fast response and filter effect. The filter parameters may be dynamically adapted to the prevailing situation.

Given fast filtering, a relative motion or change in position will in the worst case scenario be recognized in the subsequent regulating pulse after 2 ms and will then be processed within a few microseconds. The electric current regulator will virtually instantly work toward implementing the new specification of electric current. The damping force acts at some delay following the specification of electric current. The response time of the magneto-rheological fluid (MRF) is less than 1 ms. The rigidity of the system is again of minor importance. Depending on the concrete structure the new nominal value of the damping force is obtained within a few milliseconds. Jump response times of less than 10 ms are readily feasible with the system and have been verified successfully in the past. Depending on the requirements and available manufacturing costs, faster components may be employed which allow jump response times in the region of one-digit milliseconds.

Regulation may also be based on fuzzy logic and/or learning.

Two or more dampers may be linked electrically to form one system. In this case e.g. relevant data are transmitted from a first damper to a second damper in real time such that it can better adapt to the event. For example the damper in the suspension fork can transmit the information to the rear wheel damper such that the latter can anticipate e.g. a severe shock. The entire system will thus be more efficient. Also/or a hydraulic link of two or more dampers is possible (open or closed hydraulic system).

The damper device may comprise two or more controllable damping valves having one (or multiple) field generating device(s). These may be attached external of the components movable relative to one another. It is also possible to provide at least one permanent magnet which generates a static magnetic field. The strength of the magnetic field effectively acting in the damping valve can then be modulated in real time by the magnetic field generated by the electric coil as the field generating device.

On the whole the invention provides an advantageous shock absorber which can be applied both as a rear wheel shock absorber and in a suspension fork. Different basic damping in the compression and/or rebound stages is enabled in a simple way. The difference depends on the orientation of the one-way valves in the flow apertures. In this way a flexible and comprehensive adaptation to many different requirements can be ensured. Controlling takes place in real time so as to provide prompt and immediate response to all the occurring events, disturbances, shocks or obstacles.

The invention claimed is:

1. A shock absorber for a bicycle, comprising:
   a damper device formed with a first damper chamber and at least one second damper chamber;
   a damping piston unit including a damping piston and a piston rod, said piston rod having at least one through hole formed therein and oriented substantially radially, said through hole in said piston rod having an inlet terminating with an inclination toward said damping piston for effecting end stop cushioning;
   at least one damping valve disposed at said damping piston and hydraulically connecting said first and at least one second damper chambers, said damping valve having at least one flow duct with a field-sensitive, rheological medium and at least one field generating device configured for generating a field and controlling a field intensity in said flow duct of said damping valve;

said flow duct in said damping valve including at least one collection chamber hydraulically connected with said first damper chamber through a plurality of flow apertures, with at least one of said flow apertures being a through hole and at least one of said flow apertures being a closable valve opening provided with a one-way valve; and said collection chamber being hydraulically connected with said second damper chamber via a plurality of damping ducts each separated from one another by a fan wall.

2. The shock absorber according to claim 1, wherein said damping ducts are configured to be active both in compression stage damping and rebound stage damping.

3. The shock absorber according to claim 1, wherein said one-way valve is configured to automatically open in compression stage damping and to automatically close in rebound stage damping.

4. The shock absorber according to claim 1, wherein said flow apertures with said one-way valves are substantially disposed at said damping piston and are substantially oriented axially.

5. The shock absorber according to claim 1, which comprises at least one spring device having a first spring chamber and at least one second spring chamber provided with a compressible medium.

6. The shock absorber according to claim 5, which comprises a damper housing, and said damper device is disposed in said damper housing, wherein said damper housing dives into a spring device during a damper compression.

7. The shock absorber according to claim 6, wherein a second spring chamber radially surrounds at least in part said first damper chamber, at least in the rebound state, or wherein said damper device and said spring device are disposed separately.

8. The shock absorber according to claim 1, which comprises a spring piston disposed movable relative to said piston rod.

9. The shock absorber according to claim 8, wherein said apertures include one through hole and said spring piston is configured to close said one through hole in compressing.

10. The shock absorber according to claim 6, wherein said apertures include one through hole and an end of said damper housing is configured for closing said one through hole in compressing.

11. The shock absorber according to claim 1, wherein at least one of said damping ducts is disposed to be exposed to a field of said field generating device extending in the radial direction.

12. The shock absorber according to claim 1, which comprises at least one magnetically conducting ring conductor radially outwardly surrounding said the field generating device and/or said damping ducts.

13. The shock absorber according to claim 1, wherein at least one or more of the following is true:
  said fan wall has a wall thickness less than twice a smallest clear extension of a damping duct transverse to a flow direction;
  a cross-sectional area of said fan wall is smaller than a cross-sectional area of at least one damping duct;
  said fan wall has a wall thickness smaller than one tenth of a length of said fan wall in the flow direction;
  said fan wall has a wall thickness smaller than one fifth of a width of said fan wall transversely to the flow direction.

14. The shock absorber according to claim 1, wherein said damping duct is disposed such that flow passes through the damping duct in a compression stage and in a rebound stage, and wherein said damping valve includes mutually separate flow valves for the compression stage and the rebound stage.

15. The shock absorber according to claim 1, wherein a flow resistance is adjustable by at least one exchangeable flow valve for adjusting a basic curve of a characteristic damper curve.

16. The shock absorber according to claim 1, which comprises at least one mechanical adjusting device for adjusting a flow resistance of at least one flow valve for adjusting a basic curve of a characteristic damper curve.

17. The shock absorber according to claim 1, wherein at least one flow valve in a compression stage and at least one flow valve in a rebound stage are adjustable by way of at least one mechanical adjusting device each or by way of an exchangeable flow valve for adjusting a basic curve of a characteristic damper curve.

18. The shock absorber according to claim 8, wherein said apertures include a plurality of through holes and said spring piston is configured to close said through holes in compressing.

19. The shock absorber according to claim 6, wherein said apertures include a plurality of through holes and an end of said damper housing is configured for closing said through holes in compressing.

* * * * *